(12) United States Patent
Zalewski et al.

(10) Patent No.: US 8,549,554 B2
(45) Date of Patent: Oct. 1, 2013

(54) DYNAMIC REPLACEMENT OF CINEMATIC STAGE PROPS IN PROGRAM CONTENT

(75) Inventors: Gary Zalewski, Oakland, CA (US); Riley R. Russell, San Mateo, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 491 days.

(21) Appl. No.: 11/371,367

(22) Filed: Mar. 7, 2006

(65) Prior Publication Data

US 2007/0214476 A1     Sep. 13, 2007

(51) Int. Cl.
*H04N 7/10* (2006.01)
*H04N 7/025* (2006.01)
*H04N 9/74* (2006.01)
*H04N 5/272* (2006.01)

(52) U.S. Cl.
CPC .................................. *H04N 5/2723* (2013.01)
USPC .............................. 725/32; 348/586; 348/589

(58) Field of Classification Search
USPC ........................................ 725/32–36; 705/14
See application file for complete search history.

(56) References Cited

U.S. PATENT DOCUMENTS

| | | | |
|---|---|---|---|
| 5,099,322 A | 3/1992 | Gove | |
| 5,953,076 A | 9/1999 | Astle et al. | |
| 6,297,853 B1 | 10/2001 | Sharir et al. | |
| 6,373,508 B1 | 4/2002 | Moengen | |
| 6,624,853 B1 | 9/2003 | Latypov | |
| 6,954,498 B1 | 10/2005 | Lipton | |
| 7,015,978 B2 * | 3/2006 | Jeffers et al. | 348/586 |
| 7,020,381 B1 | 3/2006 | Kato et al. | |
| 8,151,295 B1 | 4/2012 | Eldering et al. | |
| 2002/0002525 A1 * | 1/2002 | Arai et al. | 705/37 |

(Continued)

FOREIGN PATENT DOCUMENTS

| EP | 1168210 A1 | 1/2002 |
|---|---|---|
| EP | 1416727 A1 | 5/2004 |

(Continued)

OTHER PUBLICATIONS

Wang, Yang et al. "Estimation of multiple directional light sources for synthesis of augmented reality images." CS Dep't, SUNY Stony Brook, 2003. http://www.cs.sunysb.edu/vislab/wordpress//papers/GM2003.pdf.*

(Continued)

*Primary Examiner* — Bennett Ingvoldstad
(74) *Attorney, Agent, or Firm* — Fitch, Even, Tabin & Flannery, LLP

(57) ABSTRACT

Stage props, such as consumer products, in legacy program content are replaced with dynamically replaceable assets. Such assets can be used for advertising purposes in that images of different products and services can be inserted therein and are changeable via a network. Such assets may be created by identifying props in the content for replacement, determining location and visual effects information for each identified prop, and creating a reference file that includes the content and the location and the visual effects information associated with each identified prop. A value may be determined for each asset or advertisers may bid on the assets to yield additional advertising revenue channel for the content. The content may be played back by broadcasting the content and reference information designating parameters for inserting the assets into the content. Replacement images, such as images of products, may be obtained via a network. The visual appearance of each replacement image may be modified using visual effects information so the inserted objects appear natural as if they were part of the original scene.

31 Claims, 11 Drawing Sheets

(56) References Cited

U.S. PATENT DOCUMENTS

| | | | |
|---|---|---|---|
| 2002/0027617 | A1 | 3/2002 | Jeffers et al. |
| 2002/0044683 | A1 | 4/2002 | Deshpande et al. |
| 2002/0083439 | A1 | 6/2002 | Eldering |
| 2002/0100042 | A1 | 7/2002 | Khoo et al. |
| 2002/0112249 | A1* | 8/2002 | Hendricks et al. ............ 725/136 |
| 2003/0028432 | A1 | 2/2003 | Troyansky et al. |
| 2003/0028873 | A1 | 2/2003 | Lemmons |
| 2004/0098753 | A1* | 5/2004 | Reynolds et al. ............. 725/135 |
| 2004/0193488 | A1 | 9/2004 | Khoo et al. |
| 2004/0194128 | A1 | 9/2004 | McIntyre et al. |
| 2005/0137958 | A1 | 6/2005 | Huber et al. |
| 2006/0155615 | A1* | 7/2006 | Loo et al. ........................ 705/27 |
| 2007/0055986 | A1 | 3/2007 | Gilley et al. |
| 2007/0220553 | A1 | 9/2007 | Branam et al. |
| 2007/0226761 | A1 | 9/2007 | Zalewski et al. |
| 2007/0279494 | A1 | 12/2007 | Aman et al. |
| 2008/0231751 | A1 | 9/2008 | Zalewski |
| 2010/0228421 | A1 | 9/2010 | DiBernardo et al. |
| 2011/0145856 | A1 | 6/2011 | Agarwal et al. |

FOREIGN PATENT DOCUMENTS

| | | |
|---|---|---|
| EP | 1463317 A2 | 9/2004 |
| JP | 2004-304792 A | 10/2004 |
| JP | 2007-530978 A | 11/2007 |
| WO | 97/03517 A1 | 1/1997 |
| WO | 2005/076598 A1 | 8/2005 |

OTHER PUBLICATIONS

Pending Unpublished U.S. Application by Zalewski, Gary M.; U.S. Appl. No. 11/689,982, filed Mar. 22, 2007, entitled "Scheme for Determining the Locations and Timing of Advertisements and other Insertions in Media", 19 pages, which includes the application specification, claims, and drawings.
Zalewski et al., U.S. Appl. No. 11/371,215, filed Mar. 7, 2006.
USPTO; "Non-final Office Action" corresponding to U.S. Appl. No. 11/371,215 later becoming U.S. Patent Pub. No. 2007/0226761; mailed Sep. 10, 2008; 11 pages.
Patent Cooperation Treaty; "Notification of Transmittal of the International Search Report and the Written Opinion of the International Searching Authority or Declaration" issued in PCT/US08/57373, which corresponds to U.S. Appl. No. 11/689,982; mailed Jul. 1, 2008; 2 pages.
Patent Cooperation Treaty; "International Search Report" issued in PCT/US08/57373, which corresponds to U.S. Appl. No. 11/689,982; mailed Jul. 1, 2008; 2 pages.
Patent Cooperation Treaty; "Written Opinion of the International Searching Authority" issued in PCT/US08/57373, which corresponds to U.S. Appl. No. 11/689,982; mailed Jul. 1, 2008; 5 pages.
Patent Cooperation Treaty; "Notification of Transmittal of the International Search Report and the Written Opinion of the International Searching Authority or Declaration" issued in corresponding PCT/US07/63326; mailed Sep. 3, 2008; 2 pages.
Patent Cooperation Treaty; "International Search Report" issued in corresponding PCT/US07/63326; mailed Sep. 3, 2008; 2 pages.
Patent Cooperation Treaty; "Written Opinion of the International Searching Authority" issued in corresponding PCT/US07/63326; mailed Sep. 3, 2008; 7 pages.
USPTO; "Final Rejection" corresponding to related U.S. Appl. No. 11/371,215 later becoming U.S. Patent Pub. No. 2007/0226761; mailed Mar. 4, 2009; 11 pages.
USPTO; Office Action issued in U.S. Appl. No. 11/371,215, U.S. Patent Pub. No. US-2007-0226761-A1; mailed Sep. 10, 2009; 10 pages.
USPTO; Advisory Action issued in U.S. Appl. No. 11/371,215, U.S. Patent Pub. No. US-2007-0226761-A1; mailed Jun. 19, 2009; 3 pages.
Chinese Patent Office; "First Office Action" corresponding to related Chinese Application No. 2007.80016668.3; issued Feb. 12, 2010, 31 pages.
European Patent Office; "Extended European Search Report (including the Supplementary European Search Report and the European Search Opinion)" issued in European Application No. EP 07 757 929.0 for PCT/US2007/063326; dated Apr. 9, 2010; 7 pages.
European Patent Office; "Extended European Search Report (including the Supplementary European Search Report and the European Search Opinion)" issued in European Application No. EP 08 01 8364.3; dated Apr. 9, 2010; 8 pages.
European Patent Office; "Communication Pursuant to Article 94(3) EPC" issued in European Application No. EP 07 757 929.0 for PCT/US2007/063326; dated Aug. 11, 2010; 1 page.
European Patent Office; "European Search Report" issued in European Publication No. EP 2046043A3 for EP Application No. 08018364.3; dated Mar. 30, 2010; 3 pages.
Patent Cooperation Treaty; "International Preliminary Report on Patentability" issued in corresponding PCT/US07/63326; dated Oct. 21, 2008; 8 pages.
USPTO; Office Action issued in U.S. Appl. No. 11/371,215; dated Mar. 29, 2010; 10 pages.
Chinese Patent Office; "Second Office Action" issued in corresponding Chinese Application No. 2007.80016668.3; dated Mar. 2, 2011, 21 pages.
USPTO; Office Action issued in U.S. Appl. No. 11/689,982; dated Jun. 20, 2011; 14 pages.
USPTO; Office Action issued in U.S. Appl. No. 11/371,215; dated Jul. 22, 2011; 12 pages.
Chinese Intellectual Property Office, "Third Office Action" issued in Chinese Patent Application No. 200780016668.3 dated Jan. 31, 2012, 31 pages.
European Patent Office, "Communication pursuant to Article 94(3) EPC" issued in European Patent Application No. 08018364.3 dated Jan. 2, 2012, 7 pages.
Japanese Patent Office; "Notification of Reason(s) for Refusal" issued in corresponding Japanese Application No. 2008-558491; dated Nov. 15, 2011; 6 pages (including English translation).
European Patent Office, Communication pursuant to Article 94(3) EPC issued in European Application No. 07757929 dated Dec. 5, 2011 (6 pages).
USPTO, Final Office Action issued in U.S. Appl. No. 11/689,982 mailed Dec. 9, 2011 (11 pages).
Chinese Patent Office; "Decision of Rejection" issued in corresponding Chinese Patent Application No. 200780016668.3, dated Sep. 5, 2012, 38 pages (includes English translation).
Japanese Patent Office; "Decision of Refusal" issued in corresponding Japanese Patent Application No. 2008-558491, dated Sep. 25, 2012, 4 pages (includes English translation).
Japanese Patent Office; Notification of Reasons for Refusal issued in corresponding Japanese Patent Application No. 2008-558491; dated May 15, 2012; 4 pages (includes English translation).
USPTO; Final Office Action issued in U.S. Appl. No. 11/371,215, mailed Apr. 5, 2012, 13 pages.
Chinese Patent Office; "Fourth Office Action" issued in corresponding Chinese Patent Application No. 200780016668.3, dated May 15, 2012, 35 pages (includes English translation).
USPTO; Advisory Action issued in U.S. Appl. No. 11/689,982, mailed Feb. 27, 2012, 3 pages.
USPTO; Office Action issued in U.S. Appl. No. 11/689,982, mailed Apr. 5, 2012, 15 pages.
European Patent Office; "Communication under Rule 71(3) EPC" issued in European Patent Application No. 08018364.3 dated Jun. 25, 2012, 50 pages.
Chinese Patent Office; "First Office Action" issued in Chinese Patent Application No. 200880009256.1 dated Jun. 5, 2012 (includes English translation), 13 pages.
European Patent Office; "Extended European Search Report" issued in European Patent Application No. 12179714.6, mailed Sep. 28, 2012, 8 pages.
USPTO; Final Office Action issued in U.S. Appl. No. 11/689,982, mailed Oct. 16, 2012, 15 pages.
Patent Cooperation Treaty; "International Preliminary Report on Patentability" issued in PCT/US2008/057373; dated Sep. 22, 2009; 6 pages.

European Patent Office; "Decision to grant a European Patent pursuant to Article 97(1) EPC" issued in European Patent Application No. 08018364.3, mailed Nov. 2, 2012, 2 pages.

USPTO; Applicant-Initiated Interview Summary issued in U.S. Appl. No. 11/689,982, mailed Dec. 14, 2012, 5 pages.

Chinese Patent Office; "Decision on Rejection" issued in Chinese Patent Application No. 200880009256.1, dated Dec. 5, 2012 (includes English translation), 15 pages.

USPTO; Notice of Allowance issued in U.S. Appl. No. 11/689,982, mailed Jan. 31, 2013, 14 pages.

Japanese Patent Office; "Notification of Reasons for Refusal" issued in Japanese Patent Application No. 2012-055357, dated Apr. 16, 2013, 5 pages (includes English translation).

Japanese Patent Office; "Notification of Reasons for Refusal" issued in Japanese Patent Application No. 2012-055358, dated Apr. 16, 2013, 4 pages (includes English translation).

\* cited by examiner

DYNAMIC REPLACEMENT OF CINEMATIC STAGE PROPS IN PROGRAM CONTENT

CROSS-REFERENCE TO RELATED APPLICATIONS

This application is related to U.S. patent application Ser. No. 11/371,215, filed of even date herewith, entitled "DYNAMIC INSERTION OF CINEMATIC STAGE PROPS IN PROGRAM CONTENT," also by inventors Gary Zalewski and Riley R. Russell, and identified by the entire disclosure of which is incorporated herein by reference.

BACKGROUND OF THE INVENTION

1. Field of the Invention

The present invention relates generally to digital video processing, and more specifically to digital insertion of images in program content for use in advertising.

2. Discussion of the Related Art

One traditional form of advertising is the television commercial. Such television commercials typically consist of brief advertising spots that range in length from a few seconds to several minutes. The commercials appear between shows and interrupt the shows at regular intervals. The goal of advertisers is to keep the viewer's attention focused on the commercial, but often times the viewer will change the channel during the commercial to avoid watching the commercial.

Another way that viewers have avoided television commercials is by using digital video recorders (DVRs). With a DVR a person can record a show and then fast forward through the commercials during playback. Other media players are expected to provide viewers with even greater ability to track and skip commercials.

It is with respect to these and other background information factors that the present invention has evolved.

SUMMARY OF THE INVENTION

The present invention advantageously addresses the needs above as well as other needs by providing a method for use in modifying program content. The method comprises the steps of: identifying props in the content for replacement; determining location information for each identified prop; determining visual effects information associated with each identified prop; and creating a reference file that includes the content and the location and the visual effects information associated with each identified prop.

Another embodiment of the present invention provides a system for modifying program content. The system comprises: means for identifying props in the content for replacement; means for determining location information for each identified prop; means for determining visual effects information associated with each identified prop; and means for creating a reference file that includes the content and the location and the visual effects information associated with each identified prop.

Another embodiment of the present invention provides a method for use in generating program content. The method comprises the steps of: providing content and one or more reference files that index location and visual effects information associated with one or more replaceable props in the content; obtaining one or more replacement images for the props to be replaced; modifying a visual appearance of each replacement image using the visual effects information; and inserting the one or more replacement images in the content to replace the one or more replaceable props.

Another embodiment of the present invention provides a system for playing program content. The system comprises: means for providing the content and reference file that includes the location and visual effects information associated with one or more replaceable props in the content; means for obtaining one or more replacement images; means for modifying a visual appearance of each replacement image using the visual effects information; and means for inserting the one or more replacement images in the content to replace the one or more replaceable props.

Another embodiment of the present invention provides a computer program product comprising a medium for embodying a computer program for input to a computer and a computer program embodied in the medium for causing the computer to perform steps of: accessing a reference file that includes program content and location and visual effects information associated with one or more replaceable props in the content; obtaining one or more replacement images; modifying a visual appearance of each replacement image using the visual effects information; and inserting the one or more replacement images in the content to replace the one or more replaceable props.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

Figure 1A:
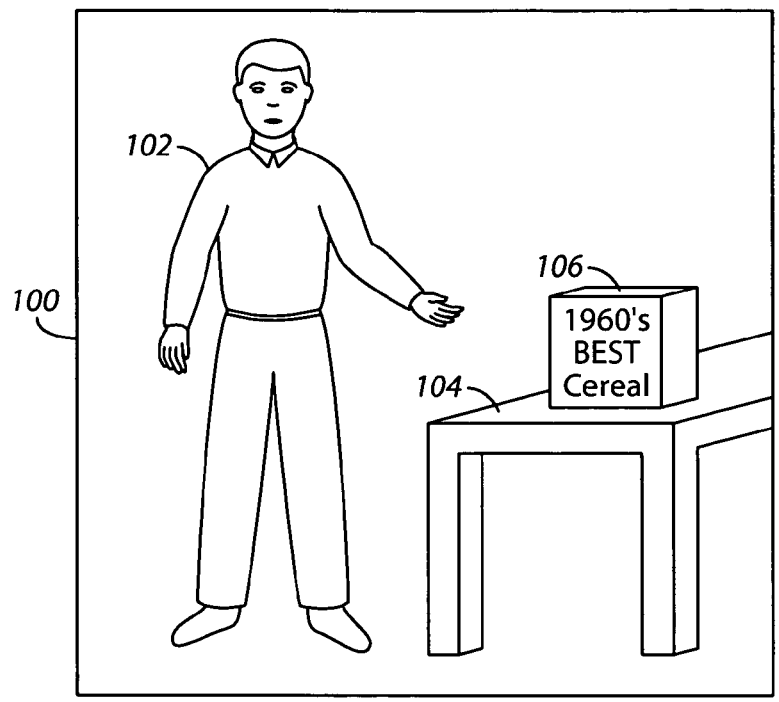
FIGS. 1A, 1B, 1C, and 1D are pictorial diagrams illustrating examples of dynamically replaceable stage props/assets in accordance with embodiments of the present invention.

When viewers avoid traditional television commercials as described above, the advertisers' messages are not received by the viewers, which is disadvantageous. Because of such disadvantages, embodiments of the present invention involve the use of advertising in the television show or other content itself.

Embodiments of the present invention involve the replacement/substitution of product placement advertisements in the content itself. That is, the content includes one or more assets, which are locations in the video where images of different products can be inserted. For example, a cereal box that appears in an episode of a certain television show can be replaced with a different brand cereal box. Typically, the company that sells the inserted cereal will pay for this asset since it is a form of advertising. In this way each time the episode of the show is aired the asset can be sold to the same or a different advertiser.

As will be described below, such assets can be identified in legacy programs. That is, many older television programs and movies include products and other stage props that may be outdated, no longer exist, be provided by companies that no longer exist, etc. Many such older programs get replayed over and over again through reruns. Embodiments of the present invention provide methods for identifying the fixed stage props in these legacy programs and converting them into dynamically replaceable props that become valuable assets. This way, each time the program is rerun an image of a current product or service can be inserted into the asset, which can be used to generate advertising revenue.

In other embodiments of the present invention new program content is developed with such advertising assets in mind from the beginning. This allows for the content to be developed to provide appropriate strategic positioning and sizing of the assets. For example, a motion picture company can work closely with advertising experts in developing the assets during production of the motion picture.

In still other embodiments of the present invention new digital props/assets are inserted into legacy programs where no fixed prop previously existed. That is, new props are added, such as for example pictures on blank walls where the pictures contain some ad-affinity, brand, etc. Such embodiments help to solve the issue where legacy content may have limited opportunity for product/stage prop replacement. Thus, for example, there is no need to replace a cereal box when one can be added into the scene.

Once the content has been modified or developed to include the dynamically replaceable advertising assets, the images of various different products and services can be changeable over a network.

Identifying Assets in Legacy Content:

Legacy content includes content that was produced in the past, perhaps years earlier. For legacy content, the first part of the process is to go through it and identify the assets that can be replaced. For example, such assets can include, but are not limited to, cereal boxes, soda cans and bottles, pizza boxes, other product boxes, cartons, containers, services, etc. The assets can include anything where a different texture, bitmap image, video stream, jpeg image, etc., of a different brand can be overlaid onto the existing object.

Referring to FIGS. 1A, 1B, 1C, and 1D, there is illustrated an example of how a fixed stage prop can be identified in legacy content and then replaced with a dynamically replaceable asset. Specifically, in FIG. 1A a scene 100 in a legacy program may include a character 102 standing next to a table 104. On the table 104 may be a fixed stage prop such as a box of cereal of a certain brand, such as for example the "1960s BEST Cereal" 106 that is shown. Because the "1960s BEST Cereal" 106 may be outdated and no longer available, it is desirable to replace it with a currently available product. Doing so would increase the advertising value of that stage prop making it a valuable asset.

Figure 1B:
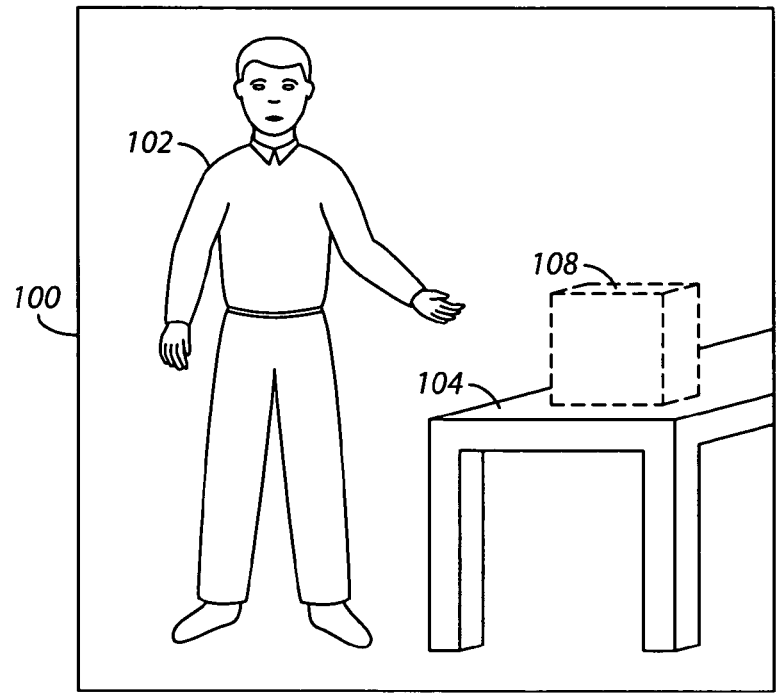

In FIG. 1B the "1960s BEST Cereal" 106 has been replaced in the scene 100 with a dynamically replaceable stage prop/asset 108. The dynamically replaceable stage prop/asset 108 comprises data that is inserted into the program content that allows different images of different products or services to be inserted into the scene to replace the previous stage prop. The new images of the different products or services are what will be seen by the viewer.

Figure 1C:
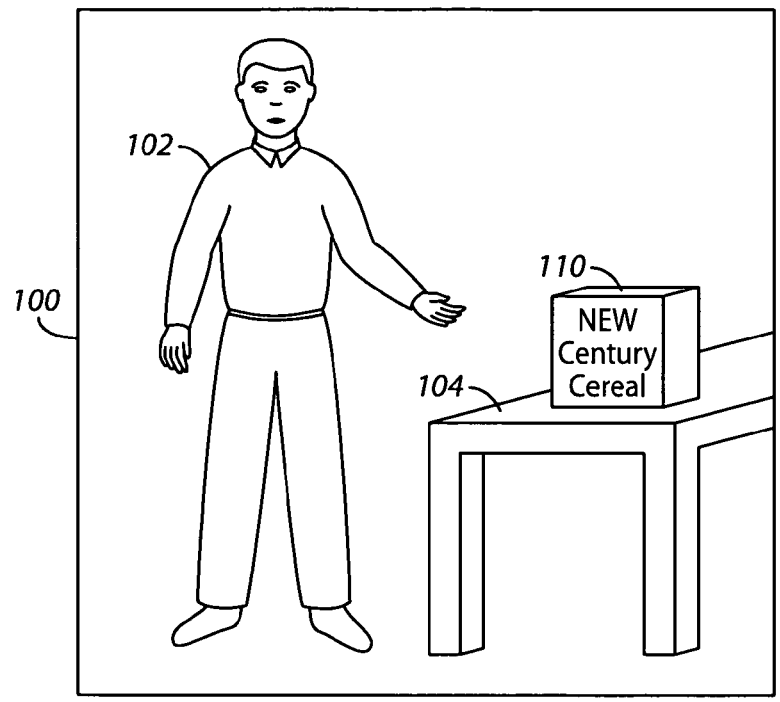
Figure 1D:
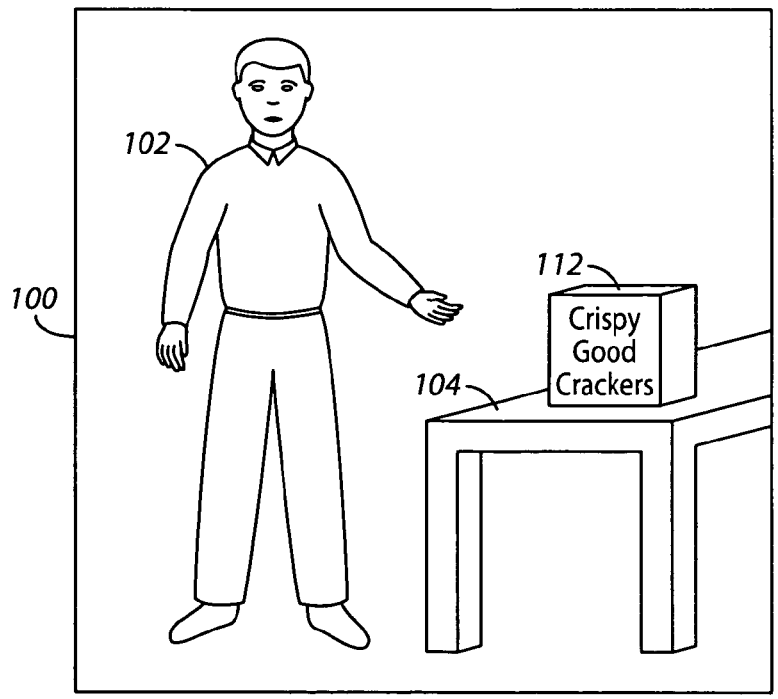

For example, in FIG. 1C a new and more modern brand of cereal called "NEW Century Cereal" 110 has been inserted into the asset 108 in the scene 100 to replace the "1960s BEST Cereal" 106. The program could be run for a period of time while the suppliers of "NEW Century Cereal" pay for this advertising opportunity. Then later, a different advertiser may want to pay to have their product displayed in the asset 108. For example, in FIG. 1D a different product altogether, namely "Crispy Good Crackers" 112, has been inserted into the asset 108 in the scene 100. The suppliers of "Crispy Good Crackers" may pay to have their product displayed for a certain period of time while the program is rerun, such as for example just one episode or possibly a whole season or more.

Figure 2A:
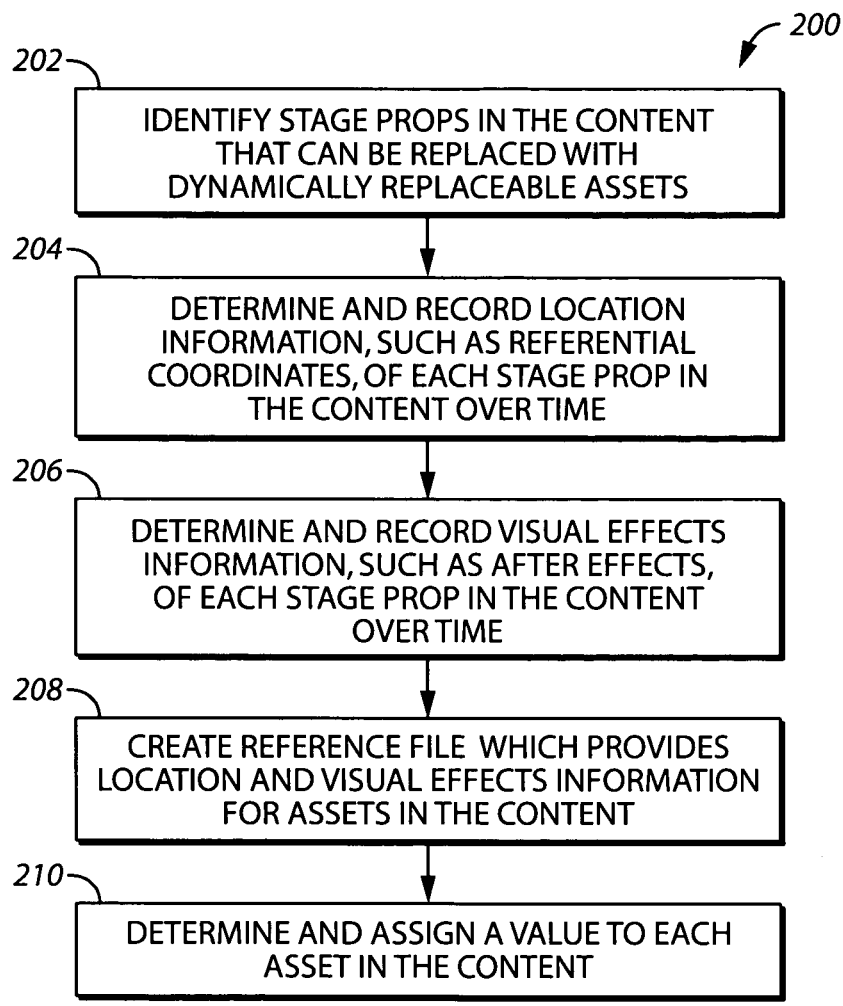
FIGS. 2A and 2B are flow diagrams illustrating methods for creating content with dynamically replaceable stage props/assets in accordance with embodiments of the present invention.

Referring to FIG. 2A, there is illustrated a method 200 of creating dynamically replaceable stage props/assets in accordance with an embodiment of the present invention. The method 200 begins in step 202 in which stage props are identified in the content. The stage props that are identified are those that can or those for which it would be advantageous to be replaced with dynamically replaceable assets.

Specifically, in accordance with some embodiments of the present invention, the process of identifying such stage props/assets may be performed manually by going through the content, i.e. on a frame-by-frame basis. With manual identification of the assets one goes through the content in a frame-by-frame or similar manner and identifies the assets. Nearly anything in the content may be used as an asset. For example, one might identify a pizza box or other product box or container that appears in the content as a stage prop.

In step 204 the referential coordinates or other location information of each stage prop/asset in the content are determined and recorded over time. That is, location information is determined for each identified stage prop that is to be replaced. For example, after an asset is identified, the content may be rewound back to the first instance of the asset. The asset is then zoomed in on and the referential coordinates of the asset are identified manually.

For example, one of the corners of the asset, such as a box, may be clicked on. Any corner may be clicked on, such as the upper left or lower right corner. An overlay region may then be identified for prop replacement in the perspective for the particular frame. Because the cameras are usually moving, one will typically manually go through each frame and plug in the coordinates that define the location of the box with respect to the camera.

The manual identification of the stage props/assets does not have to be done on a frame-by-frame basis. Namely, it can be done every other frame, every several frames, or nearly any number of frames. For example, the corners of the box can be identified in one frame and then many frames can be skipped until the position of the box changes. The frames can be skipped because the reference coordinates of the box will be the same as the previous frame.

Automated smoothing functions may be applied after manual identification process to assure that the insertion regions are bound properly and consistently, without jitter and with proper aspect ratios. Such smoothing functions may ensure that the present invention operates transparently to achieve the targeted psycho-visual experience for the end user. Other functions including those that result in jitter, strobing, halo, etc. may be applied to bring contrast or attention to the replacement prop.

In addition to tracking the referential coordinates identified for each stage prop/asset across frames, the idea, theme, concept, etc., associated with each asset may also be identified or designated. Scene information, such as light sources, diffusers, reflectors, etc., their types, locations, colors, intensities, etc. may be recorded in a time-based reference file. Other characteristics of each asset may also be identified or designated. This data is saved along with the coordinates.

All or some of the data may be used to develop a function that over the time the content is running provides appropriate referential coordinates of the location in the video of the asset so the replacement image can be calibrated to smooth the insertion of the replacement content into the media.

Determining After Effects in Legacy Content:

After the stage props/assets are identified, the after effects of the assets are then determined. Specifically, in step 206 the after effects or other visual effects information of each stage prop/asset in the content are determined and recorded over time. That is, visual effects information associated with each identified stage prop are determined. Such after effects or visual effects information may include rendering functions, variables and settings. After effects are applied according to scene information so the image psycho-visually complies with the scene environment in a proscribed manner. That is, the after effects of the original asset are determined so that the data can be used to make the replacement image, in most cases, fit in, blend with the scene and look natural.

Such after effects may include not only the coloring, shading, focus, sharpening, blurring aspect, etc., but also any other or all visual qualities that were applied to the original asset in order to match the optical qualities. Such visual qualities may, for example, include the luminescent, reflectivity, and/or shading qualities. Rendering settings are typically set to achieve visual qualities that reflect the environment of the real, original scene.

It is important to understand what after affects would have to be applied to an image to blur it or make it fit in with the original qualities of the asset being replaced. A profiling step may be used in which, for example, a soda bottle in the background is viewed to determine the magnitude of the blur level or the blur threshold.

A post filter may be used to try to match a new texture to give the optical quality of the original object. The optical quality will often change on a frame-by-frame basis. One way to check this is to check the optical quality of the asset in the first frame, and then check the optical quality of the asset in a later frame to confirm that it has the same blur level or same optical filter level. Different frames can be checked until the asset is no longer in the view of the camera.

One goal is to develop a function that over the time the content is running dictates what after effects or other visual effects information have to be applied to a new texture that is dynamically served into the content to replace a previously fixed stage prop when the content is played. Such after affects or other visual effects information may be determined over time that the content is running.

Automated Identification of Assets and After Effects in Legacy Content:

In accordance with other embodiments of the present invention, the processes of identifying assets and/or after effects of assets in legacy content may be at least partially automated. For example, a software tool that is designed for these tasks may be used. Namely, part of the process of processing a legacy video, television show, movie, or other content, could be a tool phase where a software tool is used to process the content.

Figure 2B:
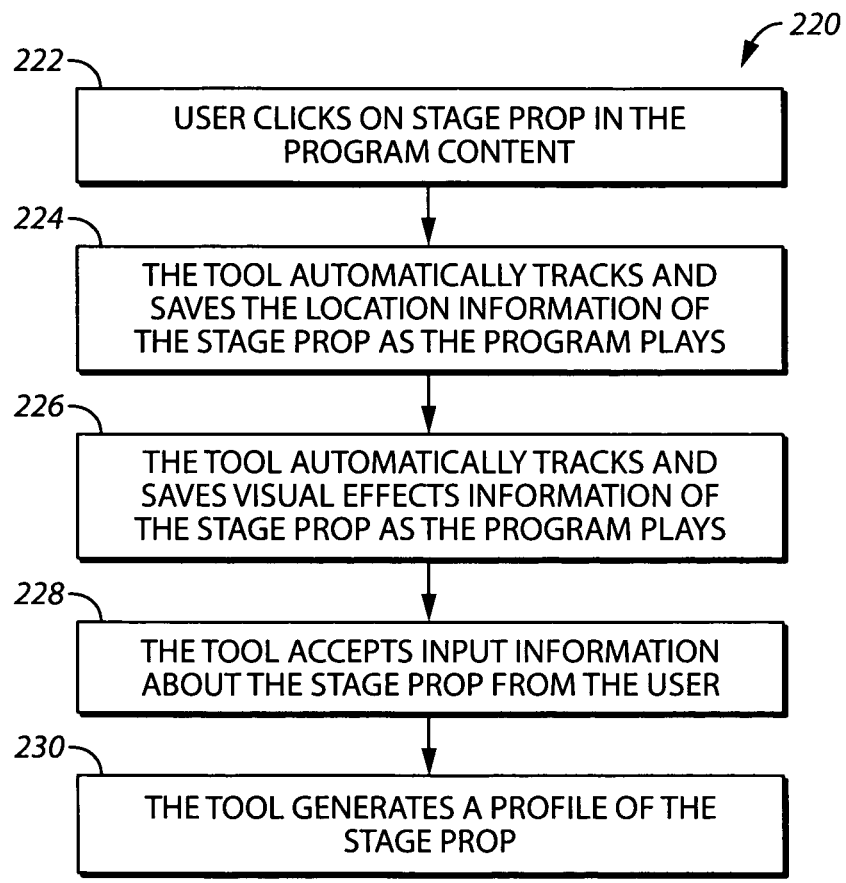

Referring to FIG. 2B, there is illustrated a method 220 that may be performed by such a tool in accordance with an embodiment of the present invention. In step 222 the user clicks on the stage prop in the content. That is, such a tool allows the user to click on the asset in the legacy content, such as a cereal box. The tool zooms in on the box and identifies the referential coordinates or other location information for the box. In step 224 the tool automatically tracks and saves the location information of the stage prop as the program content plays.

The tool may also be configured to determine the visual effects information associated with the box. In step 226, the tool automatically tracks and saves this information for the stage prop as it moves during the playing of the content.

Furthermore, in some embodiments of the present invention, the software tool also profiles the box. That is, after the box is clicked on, the tool makes a profile of it, and then the user can decide on shading, blur, etc.

The tool can be configured to accept input information about the box as part of the profiling process. Thus, in step 228 the tool accepts input information about the stage prop from the user. That is, the user can provide the tool with all the information the user has about the box in the legacy content. For example, the user can provide the tool with the type of box it is, i.e. the specific legacy product that was packaged in the box. The tool will look up the image for that specific box and will look at the pixel settings that represent the shading in that film environment. The tool will then be able to determine the general lighting principles associated with the particular bitmap image that it knows is in that location and orientation. The tool then uses all of this information to automatically do an analysis of the stage prop image and generate a profile, which is indicated by step 230.

The generated profile can indicate where the rendered asset should be shaded and where the light source should be positioned based on the camera view of the box. The profile may also include information for rendering the inserted object or predict a light source over the course of the changing camera environment. It can also show that the grading of the light is generally falling on the box in a particular pattern. The user can review all of the information in the profile and make adjustments.

The generated profile helps the user go through a calibration process for a legacy show to help find and determine all opportunities for dynamic replacement of legacy assets with advertising content.

Identifying Assets in New Content:

As was mentioned above, in other embodiments of the present invention new program content is developed with such dynamically replaceable cinematic stage props and advertising assets in mind from the beginning. This allows for the content to be developed to provide appropriate strategic positioning and sizing of the assets. For example, a motion picture company can work closely with advertising experts in developing the assets during production of the motion picture.

With new program content, the location of stage props, scene information and visual effects information such as after affects of the assets will already be known or can be captured during filming.

During film production a set of props can be used to automate the tracking of location of the prop and define the profile for the asset, based on scene information and the manipulation of the prop in the scene.

Passive or active props or a combination thereof may be used in the present invention.

Props are preferably but not necessarily shaped with a form factor to resemble the category of prop they represent (i.e. cereal box, soda can, cracker box, bottle, picture on wall, etc.).

Passive props may distinguish themselves from the scene environment to enable the present invention to automatically track the prop through a scene and in a manner that allows the system to record scene information that is reflected on the prop. Passive props may be made of green screen material, retro-reflective material combinations or suitable. Props may be encoded with visual markers, indexed visual markers or similar so the props can be referenced and tracked in the scene. For example, the X, Y, Z coordinates for the center of each of those props or the perimeter profile of the props can be tracked in an automated sense during analysis of the video frames with the present invention and matched with a definition of each of the props. Further processing may fit the prop tracking records with the profile of the prop to conform aspect ratios, smooth, etc.

Visual effects and after effects of the assets can be defined based on the known scene information, including time-based camera and prop positioning information. Given the scene information and determination of the position of the stage prop and the position of the camera, lights, etc. at any instant in time, the present invention has the appropriate inputs to compute appropriate after effect settings for the inserted stage prop.

Passive stage props may reduce or eliminate the need for the manual calibration process of going through the film frame-by-frame to identify the location of the asset tag. For example, a passive stage prop soda bottle i.e. made with retro-reflective markers is presented in the scene. As the soda bottle moves around in a character's hand, the time-based position information for the soda bottle is automatically determined by machine vision tracking methods known in the art and recorded. The position information may include orientation, tilt, yawl and roll metrics or suitable information to yield appropriate replacement regions for the soda prop/asset. Later, new props and/or replacement textures may be rendered into the frames where the soda bottle exists to effectively change the soda bottle from Coke® to Pepsi® or to a new brand that enters the market after the scene was produced.

In addition to passive props, active props may contain electronic circuits and systems that allow the prop to intelligently sense the environment in which they operate. Such sensors may enable global or local positioning capability and other sensors that record the environment in which the prop is exposed during a scene. Such sensors may include but not be limited to, photodector(s), photodetector array(s), CCD sensor(s), CCD sensor array, accelerometer, etc.

Active props may record or transmit time based telemetry data that tracks the prop in the scene along with scene information and scene information directed at the prop including reflections, shadings, lightings, etc.

Active props may be tracked in a variety of ways, including their position, orientation, tilt, yawl, roll, etc. Props may also be tracked for deformations of form. Props may be tracked to understand how they are manipulated and deformed, so replacement objects comply with the same deformation. For example, a cereal box or toothpaste prop may be tracked to determined how its shape is deformed in the scene by the actor who may manipulate the prop by squeezed, opening, closing, accessing the prop, etc.

Active props can record or transmit time-based reflections of objects that reflect onto the prop. Reflection data and other sensor data is used to configure the after effect settings for the prop at the time-index of the video frame. When mixing the new textures on the prop, the new texture is rendered with the after effect settings so the new texture can appear on the prop object with actual reflections from the scene.

Thus, with new program content the advertising assets can be developed along with the content and the manual process described above may not be needed.

Creation of Reference File:

After the assets are identified and the after effects are determined, an image or reference file is created. Specifically, in example step 208 (FIG. 2A) a reference file is created that includes the original program content along with the location and after effects data relating to identified replaceable stage props/assets. The reference file is preferably time-based so that a video frame can reference the location of the stage props and the after effect settings according to the frame.

The reference file does not need to bundle the original program content. The original content may already be available to an end user for example on a DVD, HD, memory card. In these cases, a user may download or stream a reference file that contains the time-based stage-prop location and after effect data but does not contain original content. The present invention may also operate in a mode where the user reference file is provided, and the file itself contains the time-based stage-prop location and after effect data along with the replacement ad textures but no original content. The present invention may also operate in a mode where the user reference file is provided, and the file itself contains the time-based stage-prop location and after effect data along with the replacement ad textures and the original content.

As mentioned above, the image or reference file preferably includes time-based information that allows a player to recognize when replacement stage props are present in a scene, their profile, location and rendering settings.

Valuing the Impression for Each Asset:

In accordance with another embodiment of the present invention, there is provided a method of valuing the impression for each advertising asset. Specifically, in step 210 a value is determined and assigned to each dynamically replaceable stage prop/asset in the content. That is, for each asset, such as for example a green screen cereal box, there is provided a mechanism for qualifying or valuing the quality of the impression and for tracking qualities of the impression. Determining the value of each asset will help to influence the price to be paid by a potential advertiser.

The value of each asset can depend on many different factors. Such factors may include, but are not limited to, the size of the prop relative to the size of the screen, the amount of time that the prop is visible, the amount of clarity or blur effect that is applied to the prop, etc.

Regarding the amount of clarity or blur effect that is applied to the prop, a soda bottle, for example, may be way in the back of program and it might be kind of blurry. Because of the focal length of the camera the soda bottle may not be in focus, whereas the main character of the program is in focus. Thus, the amount of focus on the soda bottle is a factor. Because the soda bottle is somewhat blurry that might feed an impression formula that would value that advertising asset slightly less than if the soda bottle was right in front of the camera and in focus.

The amount of clarity or blur effect depends on whether the image needs to be blended or blurred in the after effect post process to blend it in with the rest of the material. This is identified in the manual process described above. In the case of the automated green screen prop process, the amount of clarity or blur effect may be automatically calculated based on the focal length of the camera, the type of lens, the distance to the prop, etc.

Another factor that can be used in valuing an asset can be whether a main character touches the asset or draws attention to it in some way. The position and orientation of the asset can also be a factor. For example, a soda bottle might be positioned at an angle that might devalue the asset because it is not at its proper orientation just by way of the artistic design. Such design choices in the creation of the content can have an impact on the exposure and thus the value.

The value of the assets is a balancing of the reality and the artistic freedom of a producer with the ability then to add value to those props and change them. Based on all the different factors potential advertisers can ultimately competitively bid for advertising on those assets, as will be discussed below.

Adding New Assets to Legacy Content:

In accordance with other embodiments of the present invention, new digital props/assets are inserted into legacy programs where no fixed prop previously existed. That is, dynamically replaceable stage props/assets are established in video, web, program content in blank, open or convenient locations. These embodiments help to solve the issue where legacy content may have limited opportunity for product/stage prop replacement.

Referring to FIGS. 3A, 3B, 3C, 3D, 3E and 3F, there are illustrated examples of how dynamically replaceable props/assets can be established in program content in accordance with such embodiments of the present invention. The program content may comprise a legacy program. Specifically, in FIG. 3A there is illustrated a scene 300 in a program that may include a character 302 standing next to a table 304. Unlike the scenario described above, there is no fixed stage prop on the table 304.

Figure 3A:
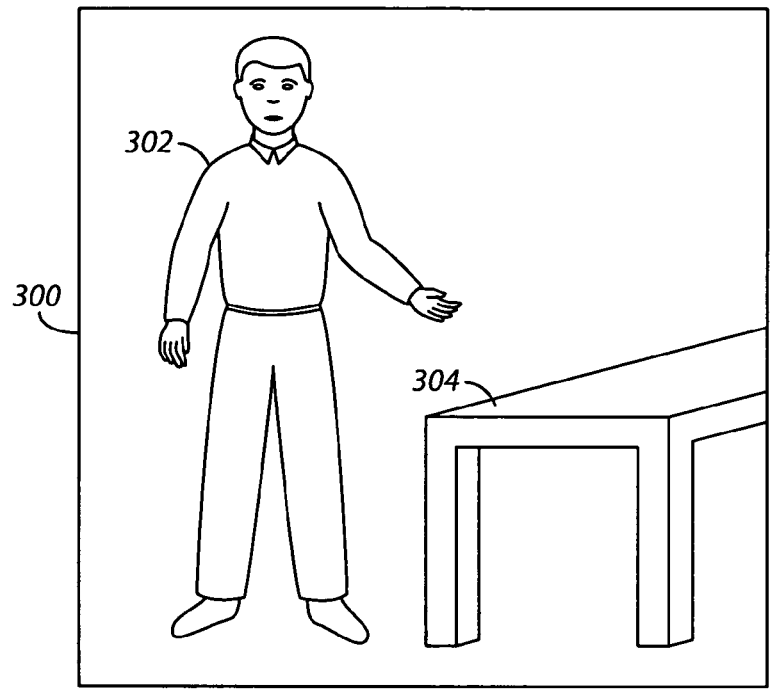
FIGS. 3A, 3B, 3C, 3D, 3E and 3F are example pictorial diagrams illustrating dynamically replaceable stage props/assets in accordance with embodiments of the present invention.
Figure 3B:
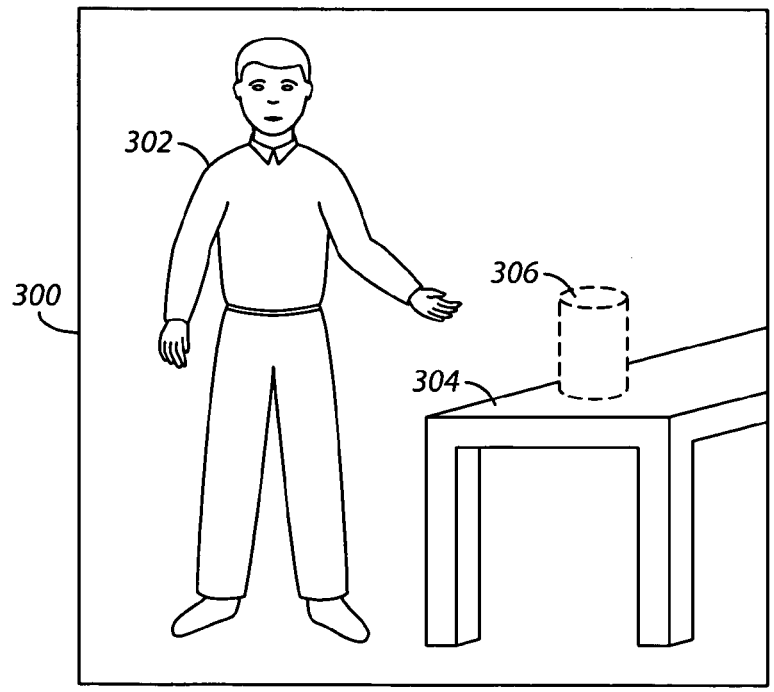
Figure 3C:
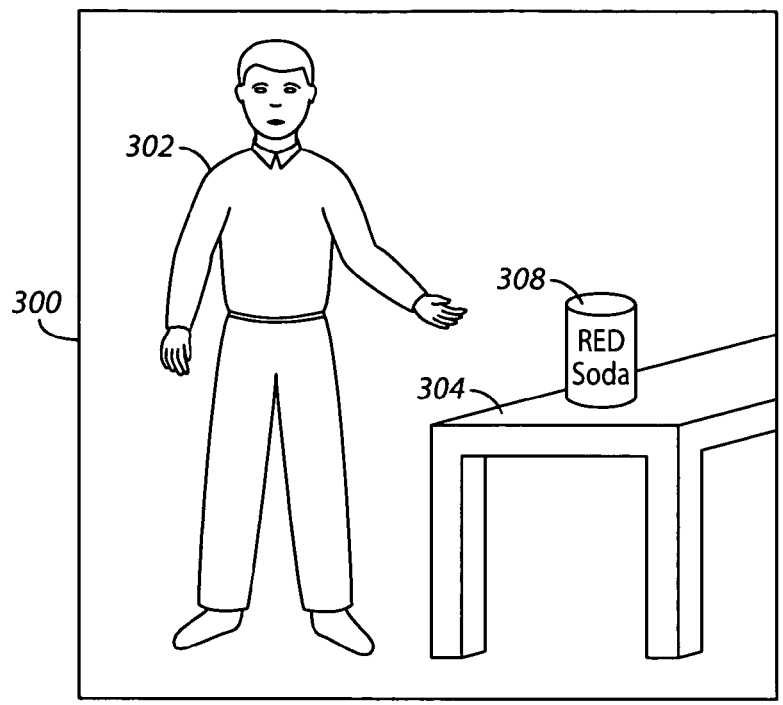
Figure 3D:
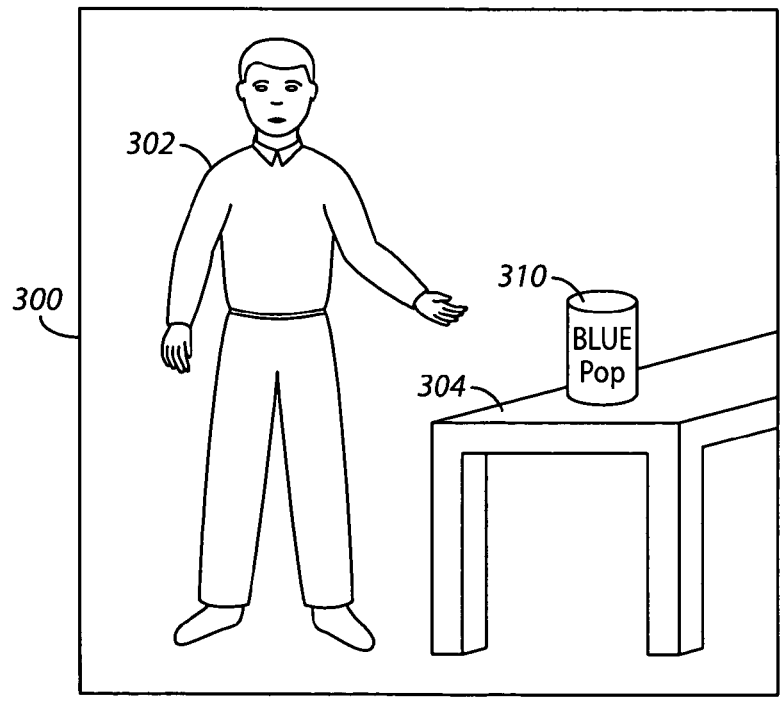

In FIG. 3B a dynamically replaceable stage prop/asset 306 representing a beverage can has been inserted into the scene 300 and positioned so that it is resting on the table 304. There was previously nothing shown on the table 304, so the insertion of the asset 306 makes valuable use of the previously blank space in this program.

The dynamically replaceable stage prop/asset 306 can now be sold to advertisers who want to insert their products into the program. For example, in FIG. 3C a brand of soda called "RED Soda" 308 has been inserted into the asset 306 in the scene 300. The program could be run for a period of time while the suppliers of "RED Soda" pay for this advertising opportunity. Then later, a different advertiser may want to pay to have their product displayed in the asset 306. For example, in FIG. 3D a different product, namely "BLUE Pop" 310, has been inserted into the asset 306 in the scene 300. The suppliers of "BLUE Pop" may pay to have their product displayed for a certain period of time while the program is rerun, such as for example just one episode or possibly a whole season or more.

Figure 3E:
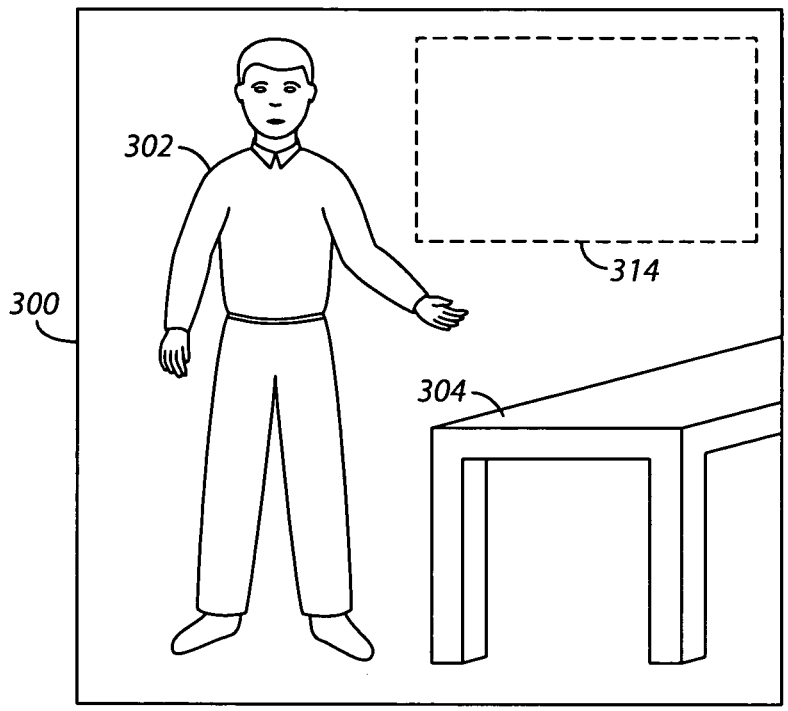
Figure 3F:
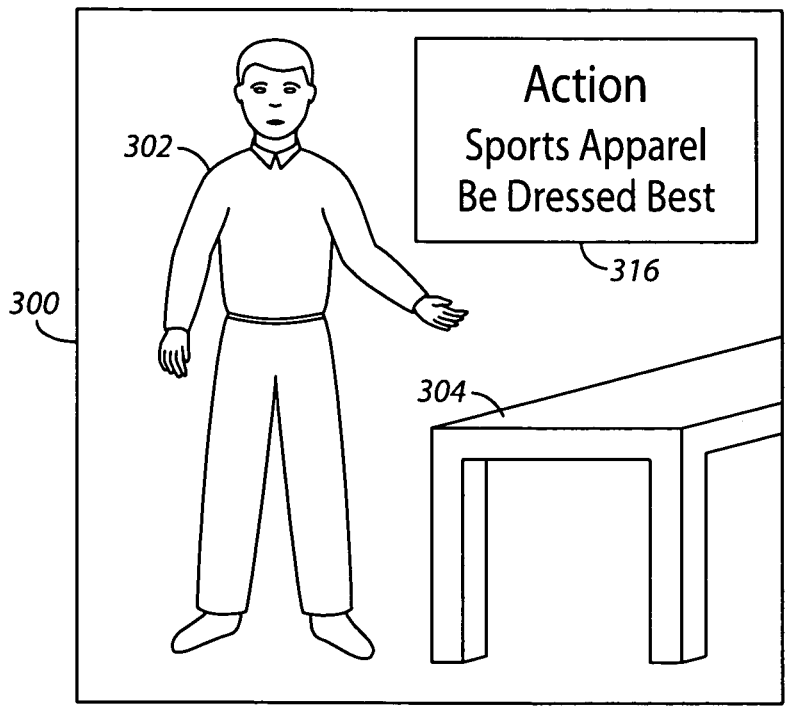

FIG. 3E illustrates that a dynamically replaceable stage prop/asset 314 representing a picture or poster can has been inserted into the scene 300 and positioned above the table 304. There was previously nothing shown on the wall, so the insertion of the asset 314 makes valuable use of the previously blank space. This dynamically replaceable stage prop/asset 314 can also be sold to advertisers who want to insert their message into the program. For example, in FIG. 3F a message regarding a brand of apparel called "Action Sports Apparel" 316 has been inserted into the asset 314 in the scene 300. In this way new props/assets can be added, such as for example pictures on blank walls where the pictures contain some ad-affinity, brand, etc.

Therefore, in these embodiments of the present invention new dynamically replaceable stage props/assets are added to the program in open or convenient locations. For example, if there is no cereal box in the original scene in the legacy program, one can be added into the scene.

Figure 4:
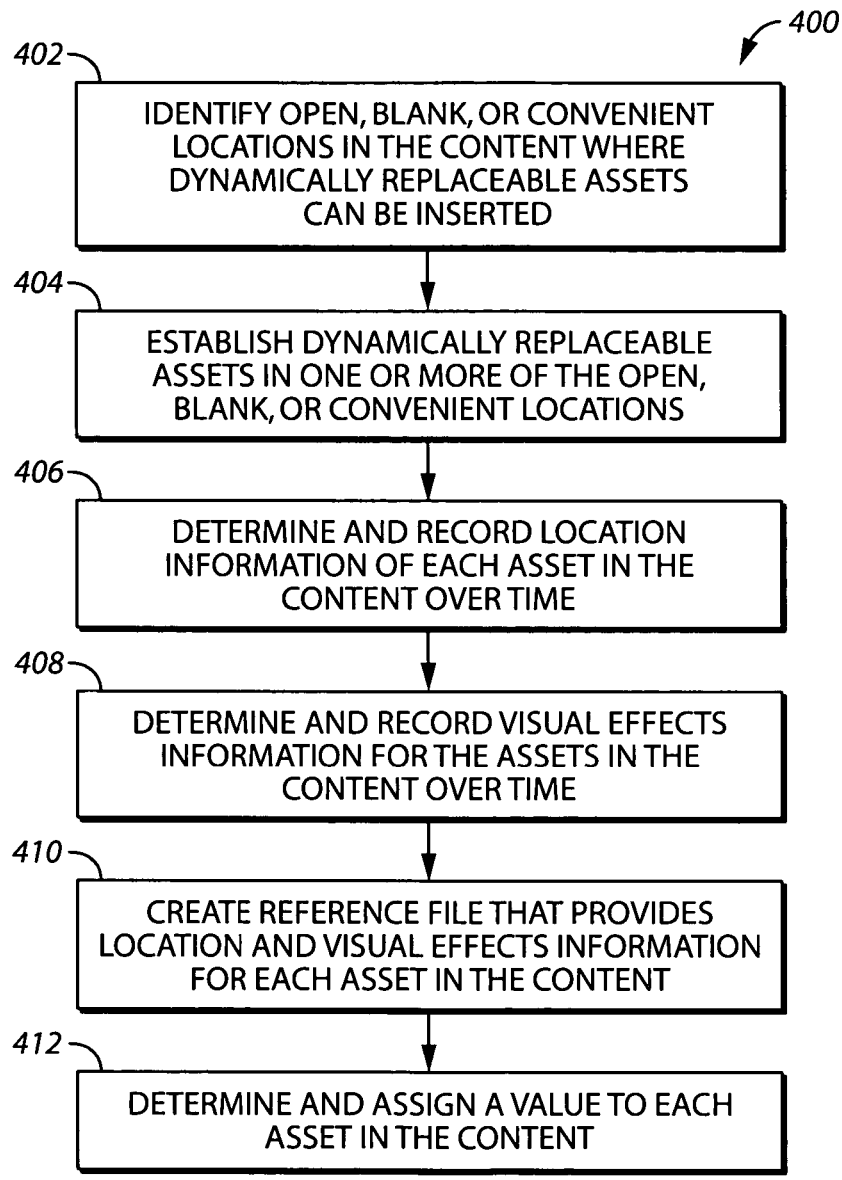
FIG. 4 is a flow diagram illustrating a method for creating content with dynamically replaceable stage props/assets in accordance with an embodiment of the present invention.

Referring to FIG. 4, there is illustrated a method 400 of adding new dynamically replaceable stage props/assets to program content in accordance with an embodiment of the present invention. In step 402 open, blank, or convenient locations in the content where dynamically replaceable assets can or are desired to be inserted are identified. In step 404 dynamically replaceable assets are established in one or more of the identified locations.

The above-described steps of saving location and visual effects information for the added assets can also be applied here where a new asset is inserted. Thus, in step 406 location information, such as the referential coordinates, for each new asset in the content is determined and recorded for each instant of time. Similarly, the processes of recording visual effects information and blending after effects can also be used. Therefore, in step 408 visual effects information of each asset in the content is determined and recorded for each instant of time. With respect to blending after effects and visual effects information, because there was no original fixed prop in the program, such blending will be to make the best fit and look with the rest of the scene.

In step 410, similar to as described above, a reference file is created that includes the original program content along with the dynamically replaceable stage props/assets. And in step 412 a value is determined and assigned to each dynamically replaceable stage prop/asset in the content.

Figure 5:
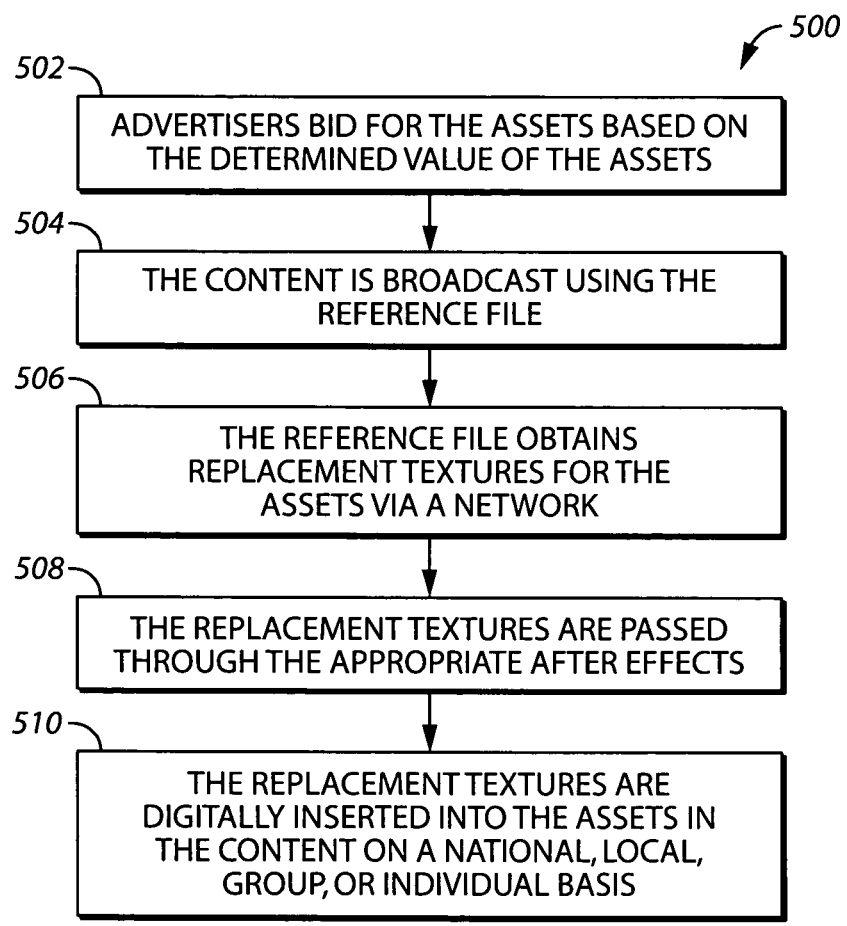
FIG. 5 is a flow diagram illustrating one method for playing back content with dynamically replaceable stage props/assets in accordance with an embodiment of the present invention.

Playback, Insertion of Replacement Images, and Networking:

Referring to FIG. 5, there is illustrated one example method 500 of playing back program content having dynamically replaceable stage props/assets in accordance with an embodiment of the present invention.

When the reference file is ultimately played back such as by downloading a TV show or playing a movie, it must be decided what replacement images will be inserted into the dynamically replaceable stage props/assets. Many schemes exist to allocate advertisement objects to the replacement props. Ads may have weights and a system may allocate ads to appropriate the genre or specific titles to accommodate requested number of impressions sought by an advertiser, etc.

Based on all the different factors potential advertisers can ultimately competitively bid for advertising in the assets. Thus, in step 502 of the method 500 advertisers bid for the assets. Such bidding may be based on the determined value of the assets.

There are many different ways such bidding can be done, such as for example by an auction or the like where the bidders are presented the program content and the types of assets available. For example, if one of the assets is a cereal box, then companies wanting to advertise cereal will bid for that particular show and asset.

Once it is decided what replacement images will be inserted into the dynamically replaceable stage props/assets, in this example, the content can then be broadcast using the reference file, as is indicated by the example step 504. As described above, in the present example, the image or reference file includes the program content as well as a function that for each instant of time provides the location and visual effects information for each dynamically replaceable stage prop/asset. As the program is played the reference file provides the referential coordinates of the location of each asset and the after affects that have to be applied to a new texture that is dynamically retrieved from a storage means using communications methods known in the art.

In step 506 of the example method the reference file obtains replacement images, objects or textures for the assets via a network. More specifically, when the media is played back the reference file will communicate with a network server and accept a new image, object or texture for each ID. Such IDs identify the dynamically replaceable stage props/assets.

In step 508 the replacement textures are passed through the appropriate after effects for each asset in the content. After the new textures are passed through the appropriate after affects they are merged into the content. This is illustrated by step 510 in which the replacement textures are digitally inserted into the assets in the content on a national, local, group, or individual basis. That is, the completed media is created by downloading the image of the replacement prop and digitally inserting the prop into the content.

The network server may comprise an advertisement server. Images of the replacement props are dynamically served from the ad server. Existing ad servers used for advertising in video games in entertainment systems may be modified for this purpose. Namely, such existing ad servers dynamically serve ads into billboards in video games. That infrastructure may be configured to dynamically serve the replacement props into the assets identified in the content.

Figure 6:
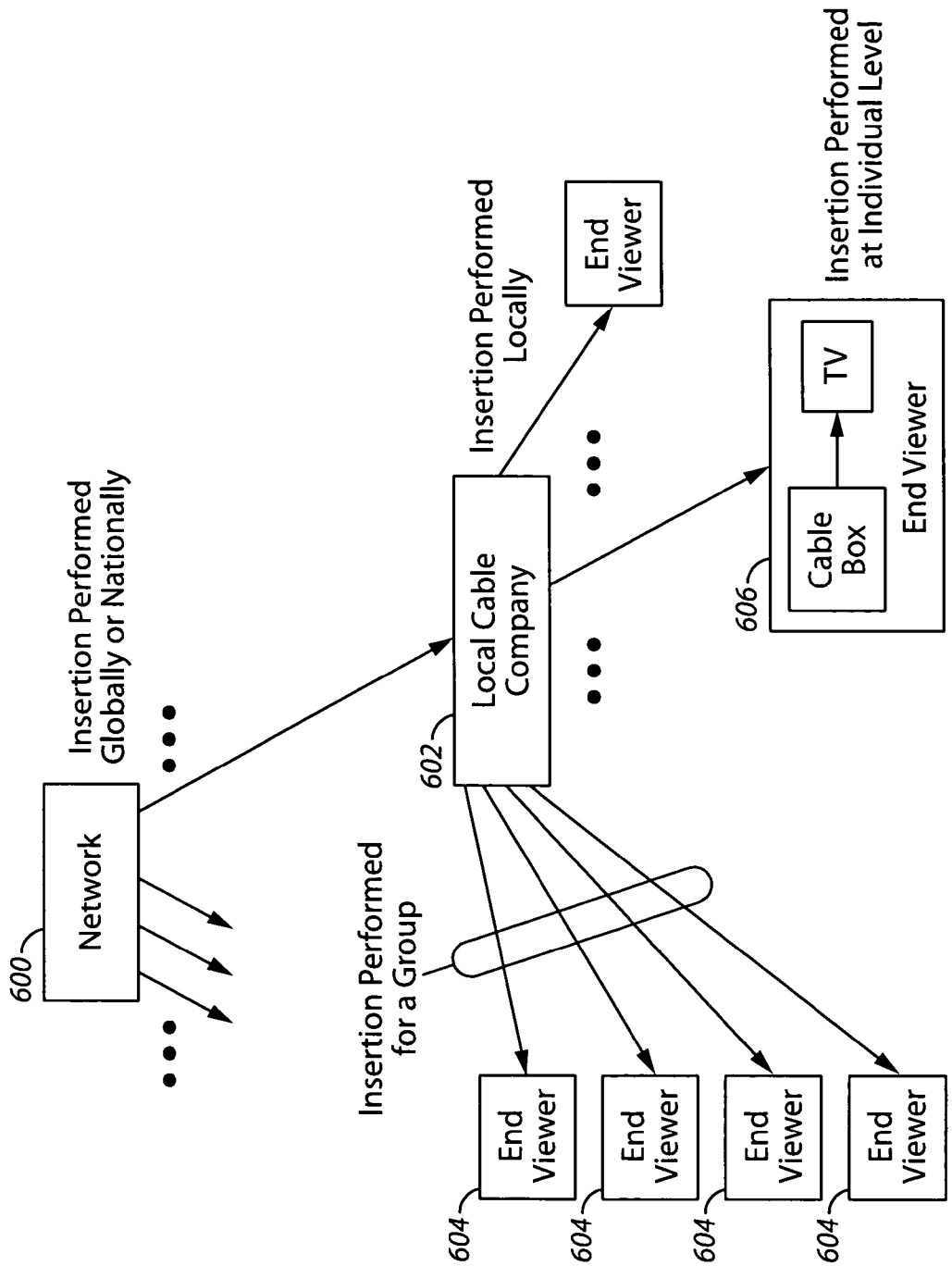
FIG. 6 is a system diagram illustrating an example implementation of a portion of the method shown in FIG. 5 in accordance with an embodiment of the present invention.

Step 510 provides that the replacement textures are digitally inserted into the content on a national, local, group, or individual basis. FIG. 6 illustrates an example of how this can be done in accordance with an embodiment of the present invention. Namely, a network 600 provides the program content to a number of cable companies, such as the cable company 602. The replacement prop insertion may be done iteratively, nationally or globally by the network 600 such that the same or mixed bundle replacement props appear in all local broadcasts. Alternatively, for programs that are broadcast nationally or globally, different replacement props and commercial textures may be inserted into the content in different local areas. For example, the replacement prop insertion may be done by local cable companies or local syndicates. The local cable company 602 may insert the same prop that is inserted nationally, or a prop having local significance may be inserted.

In another embodiment, different replacement props and commercial textures may be inserted into the content depending on a type or group of viewers. For example, one or more textures may be inserted for only the end viewers 604. In other embodiments, different replacement props and commercial textures may be inserted into the content for only a specific, individual viewer. An example of this scenario is illustrated for the end viewer 606 where the ad insertion is performed by the viewer's cable box, entertainment system, or the like. The program content can be downloaded to the viewer's cable box or entertainment system and then the ad insertion performed.

Profiling can be used for the scenario where the replacement prop depends on the type of viewer. Such profiling can utilize a user profile for each viewer. For example, for viewers that are hockey fans, they might see hockey props in the program content. Thus, the props and the style of the props are dependent on the profile of the user.

Therefore, there are many different ways that the network can flow the ads into the media.

Figure 7:
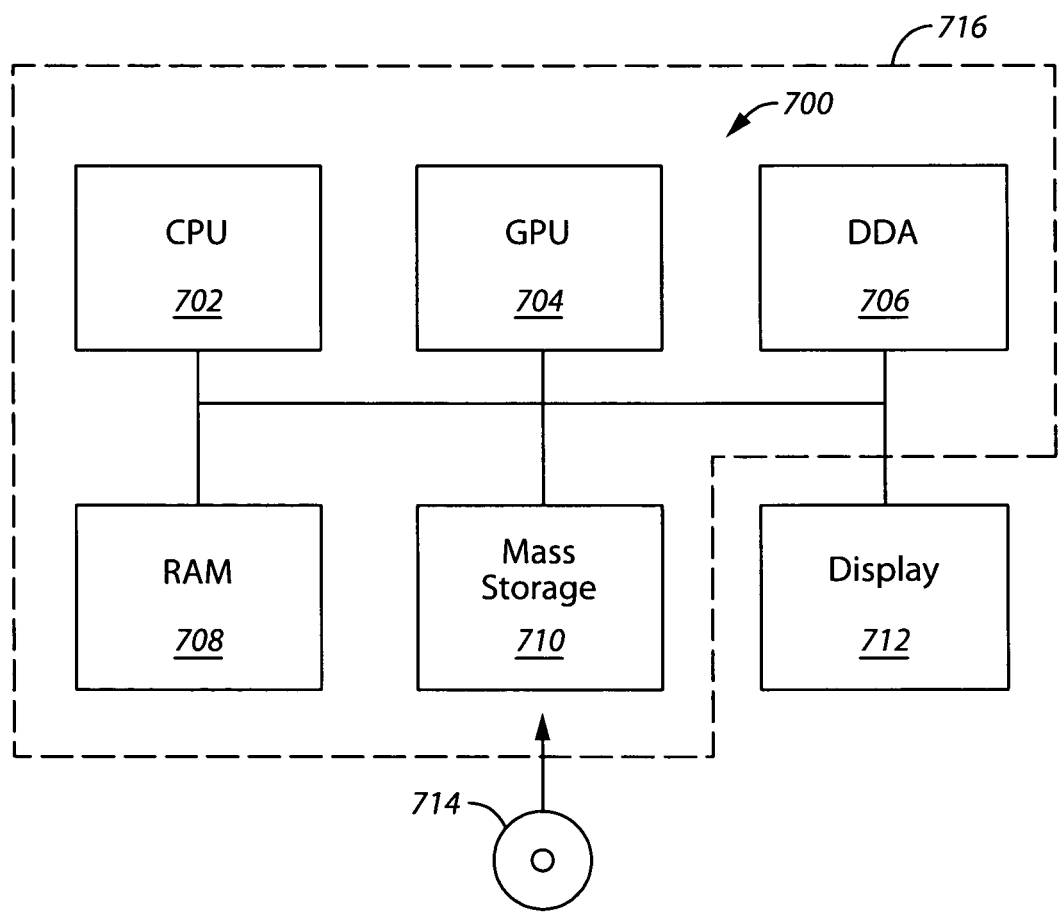
FIG. 7 is a block diagram illustrating a computer system that may be used to run, implement and/or execute the methods shown and described herein in accordance with embodiments of the present invention.

The methods and techniques described herein may be utilized, implemented and/or run on many different types of computers, graphics workstations, video game systems, DVD players, DVRs, media players, home servers, video game consoles, cell phones, portable devices, wireless devices and the like. Referring to FIG. 7 there is illustrated such a system 700 that may be used to implement and/or run the methods and techniques described herein. The system 700 includes a central processing unit (CPU) 702, a graphics processing unit (GPU) 704, digital differential analysis (DDA) hardware 706, a random access memory (RAM) 708, a mass storage unit 710, such as a disk drive, and a display monitor 712.

The CPU 702 and/or GPU 704 can be used to execute the steps of the methods and techniques described herein, and the various program content and images can be rendered on the display monitor 712. Removable storage media 714 may optionally be used with the mass storage unit 710, which may be used for storing code that implements the methods and techniques described herein. However, any of the storage devices, such as the RAM 708 or mass storage unit 710, may be used for storing such code. Either all or a portion of the system 700 may be embodied in a device 716, such as for example a computer or video game console or system. Simulations and/or processing may be run concurrently with other graphics tasks. On a multi processing core, simulations can be executed on a separate processor.

While the invention herein disclosed has been described by means of specific embodiments, examples and applications thereof, numerous modifications and variations could be made thereto by those skilled in the art without departing from the scope of the invention set forth in the claims. For example, the replacement images may be received over a network or through some other means, including DVD, memory card, etc. Ad textures and replacement images may include a model, image or combination(s). Program content and reference file may be streamed. The original program content may include the original program content and/or a modified encoded version of the original program content. The present invention may also be used to insert or replace stage props in traditional commercial advertisements themselves. The present invention can be used for a variety of purposes, including new video immersive game and entertainment models, messages, controls, tickers, news, frames are immersively placed and optimized for time-based scene specific placement, etc. The present invention may be used to insert or replace props in commercial banner ads placed in traditional distribution channels, including broadcast, web, network tv, games, etc. It should be well understood that 'content' may include, but is not limited to, television shows, programs, films, movies, videos, websites, commercials, documentaries, video games, etc.

The present invention may be configured to upload feedback records to track media use and user exposure to the advertisements. Ad models, textures may be buffered in storage on a device having intermitted network access. Ads may be placed on rotation schedules. The reference file may be one or more files and contain other elements and objects and location data and after effect data may be separated in physically different files or streamed over a network over different channels—this is still referred to as "reference file". The present invention may be used on portable devices, cell phones, etc.

What is claimed is:

1. A method, comprising the steps of:
    identifying stage props in content for replacement, wherein each stage prop comprises an object placed in a scene and bounded by a shape in the content;

determining location information for each identified stage prop;

determining visual effects information associated with each identified stage prop;

generating a profile for each identified stage prop that indicates where a replacement image should be shaded and where a light source should be positioned based on a camera view of each identified stage prop;

creating a reference file that includes the profile, location and the visual effects information associated with each identified stage prop; and determining a value associated with each identified stage prop based on factors associated with each identified stage prop's appearance in the content;

wherein the reference file is stored in a tangible computer readable medium; and wherein the value is of a type that will influence a price to be paid for advertising; and wherein the step of generating a profile is performed by a software tool that accepts input information about a stage prop from a user, looks up a reference image associated with the stage prop intended to be replaced, and then automatically performs an analysis of the reference image and the stage prop to generate the profile.

2. A method in accordance with claim 1, wherein the steps of determining location information and determining visual effects information are performed automatically by the software tool.

3. A method in accordance with claim 2, wherein the software tool accepts input information about each identified stage prop.

4. A method in accordance with claim 1, wherein the location information comprises referential coordinates.

5. A method in accordance with claim 1, wherein the visual effects information comprises after effects.

6. A computer program product comprising a non-transitory medium for embodying a computer program for input to a computer and a computer program embodied in the medium for causing the computer to perform steps comprising:

identifying stage props in content for replacement, wherein each stage prop comprises an object placed in a scene and bounded by a shape in the content;

determining location information for each identified stage prop;

determining visual effects information associated with each identified stage prop;

generating a profile for each identified stage prop that indicates where a replacement image should be shaded and where a light source should be positioned based on a camera view of each identified stage prop;

creating a reference file that includes the profile, location and the visual effects information associated with each identified stage prop; and determining a value associated with each identified stage prop based on factors associated with each identified stage prop's appearance in the content;

wherein the value is of a type that will influence a price to be paid for advertising; and wherein the step of generating a profile is performed by a software tool that accepts input information about a stage prop from a user, looks up a reference image associated with the stage prop intended to be replaced, and then automatically performs an analysis of the reference image and the stage prop to generate the profile.

7. A computer program product in accordance with claim 6, wherein the computer program further causes the computer to perform a step comprising:

accepting input information about each identified stage prop.

8. A computer program product in accordance with claim 6, wherein the location information comprises referential coordinates.

9. A computer program product in accordance with claim 6, wherein the visual effects information comprises after effects.

10. A method, comprising the steps of:

providing content and a reference file that includes profile, location and visual effects information associated with one or more replaceable stage props in the content, wherein each stage prop comprises an object placed in a scene and bounded by a shape in the content;

obtaining one or more replacement images that are selected based on competitive bids submitted by potential advertisers;

modifying a visual appearance of at least one replacement image using the profile and visual effects information;

inserting the one or more replacement images in the content to replace the one or more replaceable stage props; and displaying the content on a display;

wherein the profile for each replaceable stage prop indicates where a replacement image should be shaded and where a light source should be positioned based on a camera view of each stage prop; and wherein the profile for each replaceable stage prop is generated by a software tool that accepts input information about a stage prop from a user, looks up a reference image associated with the stage prop intended to be replaced, and then automatically performs an analysis of the reference image and the stage prop to generate the profile.

11. A method in accordance with claim 10, wherein the replacement images are transmitted over a network.

12. A method in accordance with claim 10, wherein at least one replacement image is contained in the reference file.

13. A method in accordance with claim 10, wherein the step of modifying a visual appearance of each replacement image comprises adjusting a blur effect.

14. A method in accordance with claim 10, wherein the step of inserting is performed on a national basis.

15. A method in accordance with claim 10, wherein the step of inserting is performed on a local basis.

16. A method in accordance with claim 10, wherein the step of inserting is performed on an individual basis.

17. A system, comprising:

a processor based apparatus that is configured to perform steps that include, providing content and a reference file that includes profile, location and visual effects information associated with one or more replaceable stage props in the content, wherein each stage prop comprises an object placed in a scene and bounded by a shape in the content;

obtaining one or more replacement images that are selected based on competitive bids submitted by potential advertisers;

modifying a visual appearance of each replacement image using the profile and visual effects information; and inserting the one or more replacement images in the content to replace the one or more replaceable stage props;

wherein the profile for each replaceable stage prop indicates where a replacement image should be shaded and where a light source should be positioned based on a camera view of each stage prop; and wherein the profile for each replaceable stage prop is generated by a software tool that accepts input information about a stage prop from a user, looks up a reference image associated with the stage prop intended to be replaced, and then automatically performs an analysis of the reference image and the stage prop to generate the profile.

18. A system in accordance with claim 17, wherein at least one replacement image is contained in the reference file.

19. A system in accordance with claim 17, wherein modifying the visual appearance of each replacement image comprises adjusting a blur effect.

20. A system in accordance with claim 17, wherein the inserting is performed on a national basis.

21. A system in accordance with claim 17, wherein the inserting is performed on a local basis.

22. A system in accordance with claim 17, wherein the inserting is performed on an individual basis.

23. A computer program product comprising a non-transitory medium for embodying a computer program for input to a computer and a computer program embodied in the medium for causing the computer to perform steps comprising:
   accessing content,
   accessing a reference file that includes profile, location and visual effects information associated with one or more replaceable stage props in the content, wherein each stage prop comprises an object placed in a scene and bounded by a shape in the content;
   obtaining one or more replacement images that are selected based on competitive bids submitted by potential advertisers;
   modifying a visual appearance of at least one replacement image using the profile and visual effects information; and
   inserting the one or more replacement images in the content to replace the one or more replaceable stage props;
   wherein the profile for each replaceable stage prop indicates where a replacement image should be shaded and where a light source should be positioned based on a camera view of each stage prop; and
   wherein the profile for each replaceable stage prop is generated by a software tool that accepts input information about a stage prop from a user, looks up an reference image associated with the stage prop intended to be replaced, and then automatically performs an analysis of the reference image and the stage prop to generate the profile.

24. A computer program product in accordance with claim 23, wherein the replacement images are transmitted over a network.

25. A computer program product in accordance with claim 23, wherein the step of modifying a visual appearance of each replacement image comprises an operation selected from the group consisting of adjusting a blur effect of an image, rendering a 3D object and texture mapping an image onto a 3D object.

26. A computer program product in accordance with claim 23, wherein the replacement images and reference file are transmitted over a network.

27. A computer program product in accordance with claim 26, wherein the content is stored on a DVD.

28. A computer program product in accordance with claim 26, wherein the content is downloaded over a network.

29. A non-transitory storage medium storing data created using the method of claim 10.

30. A non-transitory storage medium in accordance with claim 29, wherein the data comprises a motion picture.

31. A non-transitory storage medium in accordance with claim 29, wherein the data comprises a television show.

* * * * *